United States Patent
Janson et al.

(10) Patent No.: US 11,198,419 B2
(45) Date of Patent: Dec. 14, 2021

(54) METHOD FOR PRODUCING A BRAKE FORCE DEVICE FOR A VEHICLE BRAKE SYSTEM AND SUCH A BRAKE FORCE DEVICE

(71) Applicant: ZF Active Safety GmbH, Koblenz (DE)

(72) Inventors: Marcus Janson, Koblenz (DE); Nicholas Alford, Waldesch (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 16/967,436

(22) PCT Filed: Dec. 7, 2018

(86) PCT No.: PCT/EP2018/083933
§ 371 (c)(1),
(2) Date: Aug. 5, 2020

(87) PCT Pub. No.: WO2019/149412
PCT Pub. Date: Aug. 8, 2019

(65) Prior Publication Data
US 2021/0213923 A1    Jul. 15, 2021

(30) Foreign Application Priority Data
Feb. 5, 2018   (DE) .......................... 102018201727.1

(51) Int. Cl.
*B60T 11/16*   (2006.01)
*B60T 11/22*   (2006.01)
*B60T 11/236*   (2006.01)

(52) U.S. Cl.
CPC ............ *B60T 11/165* (2013.01); *B60T 11/236* (2013.01); *B60T 11/22* (2013.01)

(58) Field of Classification Search
CPC ...... B60T 11/165; B60T 11/236; B60T 11/22; B60T 11/00
See application file for complete search history.

(56) References Cited

U.S. PATENT DOCUMENTS 5,813,501 A * 9/1998 Terry, Sr. .............. B60T 11/165
                                                            188/24.11

\* cited by examiner

*Primary Examiner* — Abiy Teka
*Assistant Examiner* — Daniel S Collins
(74) *Attorney, Agent, or Firm* — Robert James Harwood

(57) ABSTRACT

The present disclosure relates to a method for producing a brake force device for a vehicle brake system, in which a housing is produced, wherein a recess is formed in the housing, wherein a piston device is arranged in the recess, wherein the piston device is movably guided in the axial direction of a longitudinal axis of the recess and along a specified maximum stroke path, and the length of the maximum stroke path of the piston device is modified for different embodiments of the brake force device. In order to improve and/or to simplify the implementation of different embodiments of the brake force device.

10 Claims, 2 Drawing Sheets

METHOD FOR PRODUCING A BRAKE FORCE DEVICE FOR A VEHICLE BRAKE SYSTEM AND SUCH A BRAKE FORCE DEVICE

CROSS-REFERENCE TO RELATED APPLICATION

This application is a national stage of International Application No. PCT/EP2018/083933, filed Dec. 7, 2018, the disclosure of which is incorporated herein by reference in its entirety, and which claimed priority to German Patent Application No. 102018201727.1, filed Feb. 5, 2018, the disclosure of which is incorporated herein by reference in its entirety.

TECHNICAL FIELD

The present disclosure relates to a method for producing a brake force device for a vehicle brake system, in which a housing is produced, wherein a recess is formed in the housing, in which a piston device is arranged in the recess, wherein the piston device is movably guided in the axial direction of a longitudinal axis of the recess and along a specified maximum stroke path, and the length of the maximum stroke path of the piston device is adapted for different embodiments of the brake force device. Moreover, the present disclosure relates to a brake force device produced by the method according to the present disclosure.

BACKGROUND

A brake force device of this kind is known from DE 10 2005 034 437 B3. In this case, seal grooves or annular grooves, into which ring seals can be inserted, are introduced into the inner circumference of the recess. The ring seals are designed to seal off pressure chambers formed by means of the recess and the piston device.

The disadvantage is that the housing has to be adapted and/or changed to a great extent for different embodiments of the brake force device. Particularly depending on a transmission ratio of an actuating device for actuating the piston device and/or on a predetermined volume displacement by means of the piston device, the housing and/or components of the housing and/or of the brake force device must be adapted and/or changed. In this context, for example, an outside diameter of the piston device can be adapted and/or changed. In corresponding fashion, an inside diameter of the recess must be adapted to the outside diameter of the piston device. The practice of adapting the maximum stroke path of the piston device for different embodiments of the brake force device is furthermore known.

However, it is disadvantageous here that this can also lead to relocation of at least one or more seal grooves. Owing to the preference for a compact construction of the brake force device, a change in the position of at least one seal groove can also entail a change in the position of other components of the housing and/or of the brake force device. In particular, it can entail relocation of a motor, a sensor element, a control unit, at least one hydraulic passage and/or at least one valve seat. This gives rise to increased expenditure on development and/or production. In particular, the number of usable shared parts for different embodiments of the brake force device is reduced.

SUMMARY

It is the object underlying the present disclosure to develop a method and/or a brake force device of the type stated at the outset in such a way that the implementation of different embodiments of the brake force device is improved and/or simplified. The number of shared parts for different embodiments of the brake force device should preferably be increased, and/or the necessity of adaptations to the housing, components of the housing and/or components of the brake force device should preferably be reduced. In particular, an alternative embodiment should be provided.

The object underlying the present disclosure is achieved by means of a method as claimed in claim 1 and by means of a brake force device as claimed in claim 14. Preferred developments of the present disclosure can be found in the dependent claims and in the following description.

The method is designed for the production of a brake force device for a vehicle brake system. Thus, the brake force device and/or the vehicle brake system can be arranged in a vehicle or motor vehicle. To implement the brake force device, a housing is produced. The housing can be produced from metal or aluminum. In particular, the housing is produced, for example, by means of a casting method. The housing can then be machined, for example. At least one recess is formed in the housing. The recess can be of cylindrical design and/or can have a cylindrical inside diameter. In particular, the recess is of the blind-hole type or is designed as a blind hole. The recess can be introduced into the housing by means of drilling or cutting. A piston device is arranged in the recess. In particular, the piston device has at least one piston. The piston device is movably guided in the axial direction of a longitudinal axis of the recess. For the movable guidance of the piston device within the recess, a maximum stroke path for the piston device is specified. The movability of the piston device in the axial direction of the recess is thus limited on the basis of the maximum stroke path. In particular, the stroke path extends in the axial direction of the longitudinal axis of the recess, and/or the stroke path coincides with the longitudinal axis of the recess. The length of the maximum stroke path of the piston device is adapted for different embodiments of the brake force device. Thus, different embodiments of the brake force device can be implemented, depending on predetermined boundary conditions and/or requirements on the brake force device, wherein at least one adaptation of the length of the maximum stroke path of the piston device is made for this purpose. In this case, the adaptation of the maximum stroke path is implemented on the basis of an adaptation of a piston length of the piston device.

It is advantageous here that a design which allows a high number of shared parts can be achieved on the basis of an adaptation of a piston length of the piston device to implement different embodiments of the brake force device. In particular, the necessary adaptations of the brake force device and/or of the housing to form different embodiments can be reduced.

According to a development, a length of the recess, in particular in the axial direction of the longitudinal axis of the recess, remains unchanged for different embodiments of the brake force device. By virtue of the adaptation of the maximum stroke path on the basis of an adaptation of a piston length of the piston device, it is thus possible for the length of the recess to be made the same or identical for different embodiments of the brake force device. Accordingly, it is possible to dispense with changing the length of the recess to adapt the maximum stroke path. As a result, a number of further adaptations and/or changes can be avoided which would otherwise be necessary when changing the length of the recess.

An outside diameter of the piston device is preferably adapted for different embodiments of the brake force device. Accordingly, the outside diameter of the piston device can be enlarged or reduced for different embodiments of the brake force device. In particular, an inside diameter of the recess is adapted to the outside diameter of the piston device specified for the respective embodiment. Accordingly, the length of the recess can remain unchanged for different embodiments of the brake force device, while the inside diameter of the recess is adapted and/or changed for different embodiments of the brake force device. In this case, it is advantageous that a change in the inside diameter of the recess has relatively small effects on the arrangement of further components of the housing and/or of the brake force device than is the case when changing and/or adapting the length of the recess.

According to a development, the housing remains unchanged for the different embodiments of the brake force device, in particular with the exception of the inside diameter of the recess and/or remains substantially unchanged. In particular, the same housing can be used for different embodiments of the brake force device. Thus, a shared part can be used as the housing. Preferably only or at most the inside diameter of the recess is adapted to the respective embodiment of the brake force device. For example, the housing can be made available as a shared part with a recess, wherein the recess has a minimum inside diameter for the piston device. If an inside diameter which is larger than the minimum inside diameter is required for the respective embodiment of the brake force device, the recess can be adapted on the basis of corresponding re-machining. The re-machining can be carried out by means of cutting and/or drilling, for example. The re-machining enables the minimum inside diameter of the recess to be enlarged to the required inside diameter.

At least one seal groove is preferably formed in an inner circumference of the recess. In particular, a plurality of seal grooves is formed in an inner circumference of the recess. The seal groove can be designed as an annular groove. A sealing element can be inserted into the seal groove. The sealing element can be designed as an annular seal or as an O-ring. The position of the at least one seal groove or the positions of a plurality of seal grooves, particularly in relation to an arrangement in the axial direction of the longitudinal axis of the recess, preferably remain/s unchanged for the different embodiments of the brake force device. This enables housing components and/or brake force device components surrounding the recess likewise to remain unchanged in respect of their position and/or design for different embodiments of the brake force device. When the inside diameter of the recess is changed and/or adapted, the seal groove and/or the sealing element can also be adapted in corresponding fashion in respect of their inside diameter.

According to a development, a sensor device is assigned to the piston device for the detection of a position change of the piston device. The sensor device can have a sensor element or a plurality of sensor elements. The sensor element can be designed as a signal receiver or as a signal transmitter. The sensor device or a sensor element can be secured on the piston device, for example. Thus, the sensor device or the sensor element can be moved together with the piston device in the axial direction of the longitudinal axis of the recess. In particular, a first sensor element can be secured on the piston device and a second sensor element can be secured in the region of the inner circumference of the recess. The second sensor element should always be positioned at the same place at the housing (independent from piston stroke). To evaluate the sensor device, the second sensor element can be connected to a control unit, in particular an electronic control unit. As an alternative, the sensor device and/or the second sensor element can be designed as an integral component of the control unit. A control unit can be secured on or in the housing. A position of the control unit preferably remains unchanged for the different embodiments of the brake force device, particularly in relation to an arrangement in the axial direction of the longitudinal axis of the recess. The control unit can be designed as an "ECU" (electronic control unit). In particular, the arrangement of the sensor device, of the first sensor element and/or of the second sensor element can remain unchanged for the different embodiments of the brake force device, particularly in relation to an arrangement in the axial direction of the longitudinal axis of the recess.

An actuator, a motor and/or a brake force boosting device are/is preferably arranged in the housing. The actuator and/or the motor can be a component of the brake force boosting device. The motor can be designed as an electric motor. Moreover, the brake force boosting device can, for example, have a piston-cylinder arrangement and/or a spindle device. The actuator, the motor and/or the brake force boosting device can be arranged partially or completely on or in the housing. In particular, the arrangement of the actuator, of the motor and/or of the brake force boosting device remains unchanged for the different embodiments of the brake force device, particularly in relation to an arrangement in the axial direction of the longitudinal axis of the recess. The outlay on production for different embodiments of the brake force device is thereby considerably reduced.

The actuator, the motor and/or the brake force boosting device are/is preferably arranged transversely or at right angles to the longitudinal axis of the recess for the piston device, particularly in relation to the respective longitudinal axis and/or longitudinal extent thereof. A particularly compact construction of the brake force device can thereby be achieved. In particular, the arrangement of the longitudinal axis of the actuator, of the motor and/or of the brake force boosting device remains unchanged for the different embodiments of the brake force device, preferably in relation to an arrangement in the axial direction of the longitudinal axis of the recess.

The piston device can have at least one pressure piston, two pressure pistons or a plurality of pressure pistons. The piston device preferably has a primary piston and a secondary piston. In particular, the primary piston and the secondary piston are arranged in succession in the recess in the direction of the longitudinal axis of the recess. It is thereby possible to achieve a tandem arrangement in which the primary piston and the secondary piston are guided movably in the recess of the housing. In this case, the primary piston can delimit a primary pressure chamber, and the secondary piston can delimit a secondary pressure chamber. The movability of the primary piston and/or of the secondary piston is limited due to the maximum stroke path of the piston device.

According to a development, as seal grooves, at least one primary seal groove is assigned to a primary piston and at least one secondary seal groove is assigned to a secondary piston. In particular, the primary seal groove and the secondary seal groove are arranged adjacent to one another. An actuator, a motor and/or a brake force boosting device are/is arranged at least partially, especially centrally, between the primary seal groove and the secondary seal groove. A particularly compact construction of the brake force device can thereby be achieved.

The housing can have a further recess. Thus, in addition to the recess for the piston device, a further recess is formed in the housing. An actuator, a motor and/or a brake force boosting device can be arranged in the further recess. In one particular non-limiting example, a longitudinal axis of the further recess can be aligned transversely or at right angles to the longitudinal axis of the recess for accommodating the piston device. The further recess can be cylindrical, of the blind-hole type and/or designed as a blind hole. In particular, the recess for the piston device and the further recess are formed or arranged separately from one another. Thus, the recess and the further recess do not overlap. The recess and the further recess are preferably separated from one another by means of the material of the housing. Moreover, the further recess can be introduced into the housing by means of cutting and/or drilling.

The further recess, the actuator, the motor and/or the brake force boosting device preferably project/s partially into a region, in particular a material region of the housing, between a primary seal groove assigned to the primary piston and a secondary seal groove assigned to the secondary piston. A compact construction of the brake force device is thereby likewise promoted.

According to a development, as seal grooves, at least one primary seal groove is assigned to a primary piston and at least one secondary seal groove is assigned to a secondary piston. In this case, the primary seal groove is situated in a first plane and the secondary seal groove is situated in a second plane. The first plane and the second plane are preferably arranged parallel to one another. The first plane and the second plane can be arranged at right angles or transversely to the longitudinal axis of the recess. In particular, the further recess, the actuator, the motor and/or the brake force boosting device can be arranged between the first plane and the second plane. The further recess is preferably spaced apart by means of the material of the housing from the primary seal groove and from the secondary seal groove.

A brake force device for a vehicle brake system which is produced by the method according to the present disclosure is of particular advantage. In this case, different embodiments of the brake force device can be implemented with a high number of shared parts. In particular, it is only or substantially only the piston length of the piston device which has to be adapted to form different embodiments. In addition, the inside diameter of the recess for the piston device can be adapted to implement different embodiments of the brake force device.

In the case of a brake force device of this kind, there can be a fluidic connection between a fluid reservoir and a pressure chamber in an initial position of the piston device, and therefore a pressure equalization can take place between these. However, as soon as the piston device is shifted or moved within the recess along the longitudinal axis of the recess when an actuating device, in particular a pedal device or brake pedal device, is actuated, the fluidic connection between the pressure chamber and the fluid reservoir is interrupted. A fluid pressure is thereby built up in the pressure chamber, and this can be used to build up a braking effect in individual wheel brake units via a hydraulic brake circuit. When the actuating device is released again, the piston device can move back in the direction of its initial position under the action of at least one return element. In particular, there is no fluidic connection to the fluid reservoir during this backward movement; instead, it is reestablished just before the initial position is reached. In this case, the required hydraulic fluid for pressure equalization in the pressure chamber, which increases in size during the backward movement of the piston device, must accordingly flow back from the hydraulic brake circuit.

In particular, the brake force device produced by the method according to the present disclosure is a brake force device described above. The method is preferably developed according to all the embodiments explained in connection with the brake force device according to the present disclosure described here. The brake force device described here can furthermore be developed according to all the embodiments explained in connection with the method.

BRIEF DESCRIPTION OF THE DRAWINGS

The present disclosure is explained in greater detail below with reference to the figures. Here, the same reference signs refer to components or elements which are identical, similar or functionally identical. In the figures.

DETAILED DESCRIPTION

Figure 1:
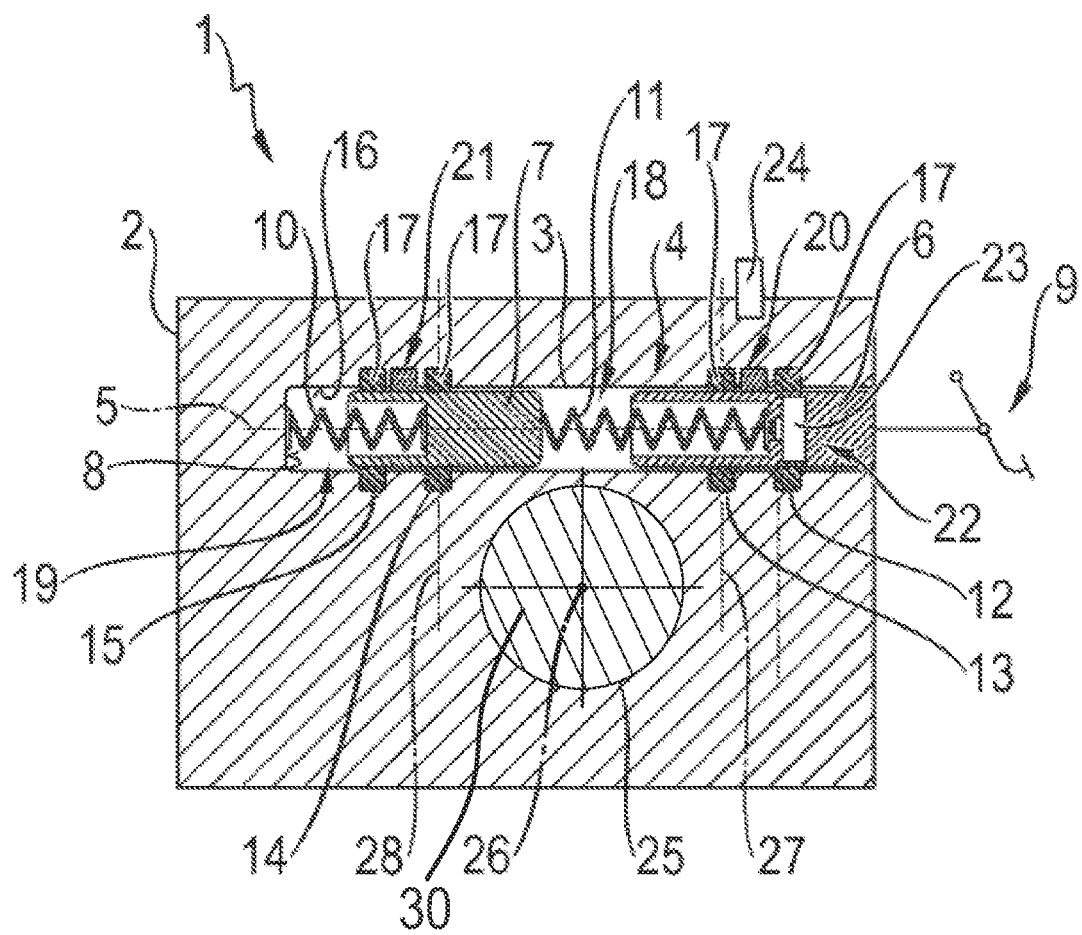
FIG. 1 shows a schematic sectioned side view of a first brake force device according to the present disclosure.

FIG. 1 shows a schematic sectioned side view of a first brake force device 1 according to the present disclosure. The brake force device 1 is designed as a component of a vehicle brake system that is not shown in further detail here. The brake force device 1 has a housing 2. The housing 2 has a recess 3. In this illustrative embodiment, the recess 3 has a cylindrical cross section and is introduced in the manner of a blind hole into the housing 2. A piston device 4 is arranged within the recess 3. The piston device 4 is movably guided in the axial direction of a longitudinal axis 5 of the recess 3. More specifically, the piston device 4 is guided in a slidably movable manner on an inner circumference 16 of the recess 3.

In this illustrative embodiment, the piston device 4 has a primary piston 6 and a secondary piston 7. The primary piston 6 and the secondary piston 7 are arranged in succession in the recess 3 in the direction of the longitudinal axis 5 of the recess 3. In this case, the secondary piston 7 is arranged between a base 8 of the recess 3 and the primary piston 6. In a region facing away from the secondary piston 7, the primary piston 6 is connected to an actuating device 9. In this illustrative embodiment, the actuating device 9 is designed as a pedal device, namely a brake pedal device.

The secondary piston 7 is supported by means of a return element 10 on the base 8 of the recess 3. The primary piston 6 is supported on the secondary piston 7 by means of a further return element 11. In this illustrative embodiment, the return elements 10, 11 are designed as return springs. On its end facing the secondary piston 7, the primary piston 6 has a socket in the form of a blind hole, into which that end of the further return element 11 which faces the primary piston 6 is inserted. On its end facing the base 8, the secondary piston 7 also has a socket in the form of a blind hole, into which an end of the return element 10 which faces the secondary piston 7 is inserted.

In this illustrative embodiment, the primary piston 6 and the secondary piston 7 each have a circular-cylindrical outer circumferential surface, by means of which they are guided in a sealing manner in the recess 3. In order to ensure sufficiently leaktight guidance and to be able to achieve the desired functioning of the brake force device 1, a plurality of seal grooves 12, 13, 14, 15 is formed in the inner circumference 16 of the recess 3. In this case, seal groove 12 is assigned to the primary piston 6 as a first primary seal groove, and seal groove 13 is assigned to said piston as a second primary seal groove. Seal groove 14 is assigned to the secondary piston 7 as a first secondary seal groove, and seal groove 15 is assigned to said piston as a second secondary seal groove. Here, the seal grooves 12, 13, 14, 15 are designed as annular grooves. A sealing element 17 is arranged in each of the seal grooves 12, 13, 14, 15. In this illustrative embodiment, the sealing element 17 is designed as a ring seal. Owing to the seal grooves 12, 13, a primary pressure chamber 18 is formed and, owing to the seal grooves 14, 15, a secondary pressure chamber 19 is formed. The primary pressure chamber 18 and the secondary pressure chamber 19 can be filled or supplied with a hydraulic fluid by means of a fluid reservoir, which is not illustrated specifically here. The fluid reservoir can be connected to the housing 2 by means of reservoir connections 20, 21. In this case, reservoir connection 20 emerges in the recess 3 between the two primary seal grooves 12, 13. Reservoir connection 21 emerges in the recess 3 between the two secondary seal grooves 14, 15.

At least one connecting bore (not illustrated specifically here) is arranged in the primary piston 6 and the secondary piston 7 respectively. These connecting bores provide a fluidic connection between the fluid reservoir (not shown here) via in each case one of the reservoir connections 20, 21 to the respectively associated primary pressure chamber 18 or secondary pressure chamber 19. However, as soon as the connecting bores slide past the seal grooves 13 and 15, respectively, owing to the actuation of the actuating device 9 and a resulting movement of the primary piston 6 and of the secondary piston 7 along the longitudinal axis 5 in the direction of the base 8, the connecting bores are closed, with the result that there is no longer a fluidic connection between the primary pressure chamber 18 and the secondary pressure chamber 19 and the fluid reservoir. As a result, there is a pressure buildup in the primary pressure chamber 18 and the secondary pressure chamber 19. This built up pressure can be used to actuate wheel brake units (not shown specifically here) via at least one or two mutually separate hydraulic brake circuits.

If a person or the driver releases the actuating device 9 again, the return elements 10, 11 push the primary piston 6 and the secondary piston 7 back into their initial position.

The brake force device 1 has a sensor device 22 for detecting a change in the position of the piston device 4. In this illustrative embodiment, the sensor device 22 has at least one sensor element 23, wherein the sensor element 23 is secured on the primary piston 6. The sensor device 22 can interact with a control unit 24 indicated only schematically here. The control unit 24 can be secured on or in the housing 2. Here, the control unit 24 is designed as an "ECU".

The housing 2 has a further recess 25. In this illustrative embodiment, the further recess 25 is of circular-cylindrical design and in the form of a blind hole. A longitudinal axis 26 of the further recess 25 is aligned at right angles to the longitudinal axis 5 of the recess 3. The further recess 25 is used to accommodate an actuator, a motor and/or a brake force boosting device 30. The further recess 25 is arranged between the second primary seal groove 13 and the first secondary seal groove 14. In this case, the further recess 25 projects partially into a region between the second primary seal groove 13 and the first secondary seal groove 14.

The second primary seal groove 13 is situated in a plane 27. The first secondary seal groove 14 is situated in a plane 28. The first plane 27 and the second plane 28 are aligned at right angles to the axial extent of the longitudinal axis 5 of the recess 3. Moreover, the two planes 27, 28 are aligned parallel to one another. The further recess 25 is arranged between the first plane 27 and the second plane 28. This enables the further recess 25 to be arranged at the smallest possible distance from the recess 3. This is favorable for a construction of the brake force device 1 which is compact overall.

Figure 2:
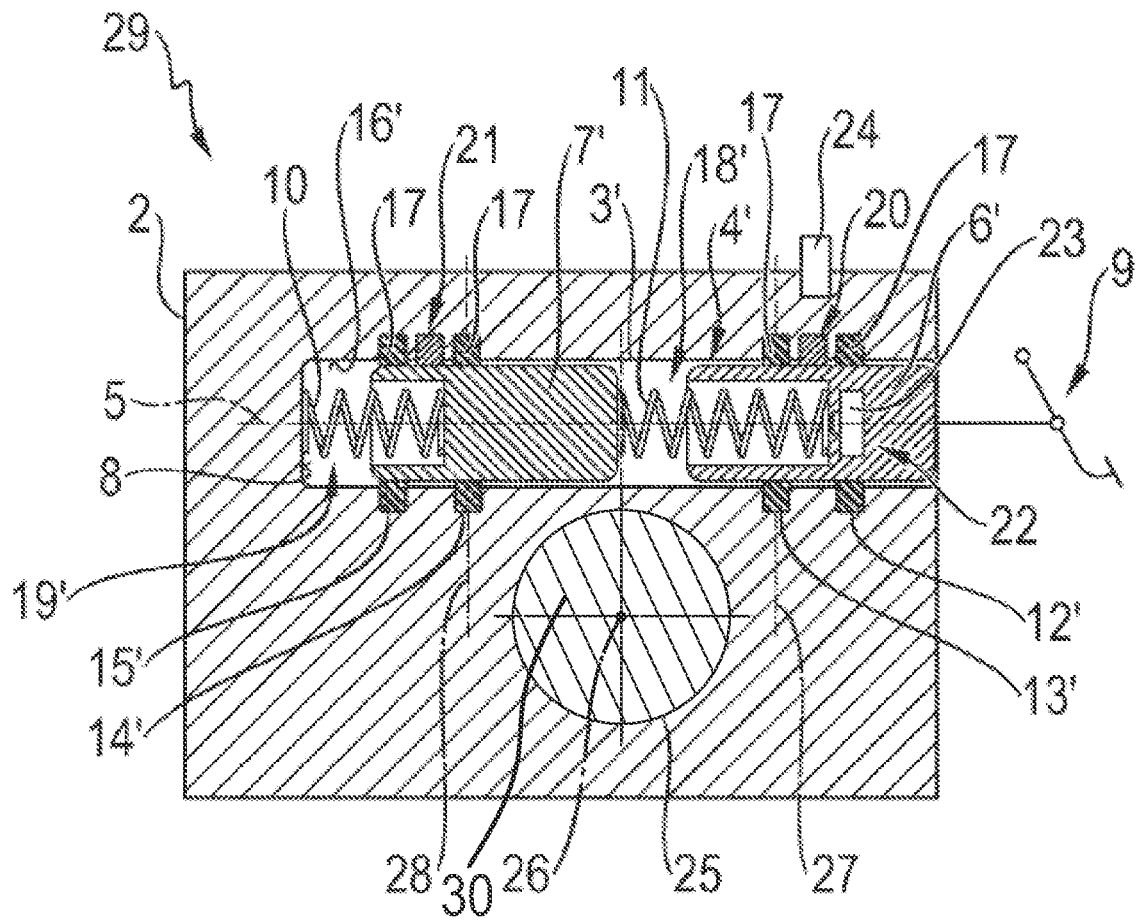
FIG. 2 shows a schematic sectioned side view of a further brake force device according to the present disclosure.

FIG. 2 shows a schematic sectioned side view of a further brake force device 29 according to the present disclosure. Brake force device 29 largely corresponds to brake force device 1 in respect of construction and operation. To this extent also, attention is drawn to the preceding description in order to avoid repetitions.

The housing 2 of brake force device 29 has a recess 3'. In contrast to the recess 3 shown in FIG. 1, the recess 3' has a larger inside diameter. In corresponding fashion, brake force device 29 has a piston device 4' with a primary piston 6' and a secondary piston 7'. The outside diameter of the primary piston 6' and of the secondary piston 7' is adapted to the inside diameter of the recess 3'. The seal grooves 12', 13', 14', 15' are also adapted to correspond to the changed inside diameter of the recess 3' in comparison with the design according to the brake force device 1 shown in FIG. 1.

In addition, the primary piston 6' and the secondary piston 7' have a different piston length from the primary piston 6 and the secondary piston 7 according to the brake force device 1 shown in FIG. 1. In this illustrative embodiment, the piston length of primary piston 6 is less than the piston length of primary piston 6'. In this illustrative embodiment, the piston length of secondary piston 7 is furthermore greater than the piston length of secondary piston 7'. As an alternative, other changes or adaptations to the piston length can also be implemented.

In contrast, the length of the recesses 3, 3' is identical. The positions of the seal grooves 12, 12', 13, 13', 14, 14', 15, 15' also remain unchanged in respect of the arrangement in the axial direction of the longitudinal axis 5. The positioning of the sensor device 22 also remains unchanged, in particular in relation to the longitudinal axis 5 of the recess 3 or 3'. Finally, the position of the two planes 27, 28 and hence also the arrangement of the further recess 25 also remain unchanged. In particular, the arrangement of the longitudinal axis 26 remains unchanged in relation to an arrangement in the axial direction of the longitudinal axis 5 of the recess 3, 3'.

Thus, different embodiments of brake force devices 1, 29 can be produced, wherein adaptation of the maximum stroke path of the piston device 4, 4' is accomplished on the basis of an adaptation of the piston length of the piston device 4, 4'.

As an alternative to the embodiments presented in FIGS. 1 and 2, it is possible in at least one further embodiment for just the piston length of the piston device 4 or 4' or just the inside diameter of the recess 3 or 3' and the outside diameter of the piston device 4 or 4' to be adapted or changed.

The invention claimed is:

1. A method for producing a brake force device for a vehicle brake system comprising the steps of:
    Providing a housing having a recess formed therein; and
    Arranging a piston device in the recess;
    wherein the piston device comprises a primary piston and a secondary piston arranged in succession in the recess in the direction of a longitudinal axis of the recess and movably guided in the axial direction of the longitudinal axis along a specified maximum stroke path, and the length of the maximum stroke path of the piston device is adapted for different embodiments of the brake force device, characterized in that the adaptation of the maximum stroke path occurs on the basis of an adaptation of a piston length of the piston device.

2. The method as defined in claim 1 wherein a length of the recess for the piston device in the axial direction of the longitudinal axis of the recess remains unchanged for different embodiments of the brake force device.

3. The method as defined in claim 1 wherein an inside diameter of the recess is adapted to an outside diameter of the piston device which is specified for the respective embodiment.

4. A method for producing a brake force device for a vehicle brake system comprising the steps of:
Providing a housing having a recessed formed therein; and
Arranging a piston device in the recess;
wherein the piston device is movably guided in the axial direction of a longitudinal axis of the recess and along a specified maximum stroke path, and the length of the maximum stroke path of the piston device is adapted for different embodiments of the brake force device, characterized in that the adaptation of the maximum stroke path occurs on the basis of an adaptation of a piston length of the piston device, wherein at least one seal groove is formed in an inner circumference of the recess, and wherein the position of the seal grooves in relation to an arrangement in the axial direction of the longitudinal axis of the recess remains unchanged for the different embodiments of the brake force device.

5. The method as defined in claim 1 wherein a sensor device is assigned to the piston device for the detection of a position change of the piston device, wherein the arrangement of the sensor device remains unchanged for the different embodiments of the brake force device.

6. The method as defined in claim 1 wherein an actuator, a motor and/or a brake force boosting device are/is arranged in the housing and the arrangement of the actuator, of the motor and/or of the brake force boosting device remains unchanged for the different embodiments of the brake force device.

7. The method as defined in claim 6 wherein the actuator, the motor and/or the brake force boosting device are arranged transversely or at right angles to the longitudinal axis of the recess.

8. The method as defined in claim 1 further including at least one primary seal groove assigned to the primary piston and at least one secondary seal groove assigned to the secondary piston, wherein the primary seal groove and the secondary seal groove are arranged adjacent to one another, and an actuator, a motor and/or a brake force boosting device are/is arranged at least partially between the primary seal groove and the secondary seal groove.

9. The method as defined in claim 1 wherein an actuator, a motor and/or a brake force boosting device are/is arranged in a further recess of the housing having a longitudinal axis aligned transversely or at right angles to the longitudinal axis of the recess for accommodating the piston device.

10. The method as defined in claim 8 wherein the primary seal groove is situated in a first plane and the secondary seal groove is situated in a second plane, the first plane and the second plane are arranged at right angles to the longitudinal axis of the recess, and the further recess, the actuator, the motor and/or the brake force boosting device are arranged between the first plane and the second plane.

* * * * *